United States Patent [19]

Koizumi et al.

[11] Patent Number: 4,783,709
[45] Date of Patent: Nov. 8, 1988

[54] MAGNETIC HEAD SUPPORTING MECHANISM FOR TAPE RECORDER

[75] Inventors: Satoru Koizumi; Susumu Chono, both of HigashiHiroshima, Japan

[73] Assignee: Sharp Kabushiki Kaisha, Osaka, Japan

[21] Appl. No.: 917,774

[22] Filed: Oct. 10, 1986

[30] Foreign Application Priority Data

Dec. 13, 1985 [JP] Japan .................. 60-281785
Dec. 13, 1985 [JP] Japan .................. 60-281786

[51] Int. Cl.⁴ .................. G11B 5/56; G11B 21/24
[52] U.S. Cl. .................. 360/109
[58] Field of Search .............. 360/104–105, 360/109, 92, 106

[56] References Cited

U.S. PATENT DOCUMENTS

| | | | |
|---|---|---|---|
| 3,812,537 | 5/1974 | Grae et al. | 360/92 X |
| 3,821,814 | 6/1984 | Gordon et al. | 360/106 |
| 3,935,595 | 1/1976 | Kondo | 360/92 |
| 4,510,543 | 4/1985 | Ohta et al. | 360/106 |
| 4,628,386 | 12/1986 | Chabrolle | 360/104 |
| 4,672,492 | 6/1987 | Muramatsu | 360/109 |

FOREIGN PATENT DOCUMENTS

| | | |
|---|---|---|
| 2802255 | 8/1978 | Fed. Rep. of Germany. |
| 1123489 | 8/1968 | United Kingdom. |
| 2086642 | 5/1982 | United Kingdom. |
| 2112993 | 7/1983 | United Kingdom. |
| 2129599 | 5/1984 | United Kingdom. |
| 2143362 | 2/1985 | United Kingdom. |
| 2100053 | 4/1985 | United Kingdom. |

Primary Examiner—John H. Wolff
Attorney, Agent, or Firm—Birch, Stewart, Kolasch & Birch

[57] ABSTRACT

A cassette tape recorder comprises a cassette tape compartment for detachably housing a plurality of cassette tapes, magnetic heads provided corresponding to the plurality of cassette tapes and a magnetic head supporting mechanism for positioning each of the magnetic heads to be faced to the corresponding cassette tape. The magnetic head supporting mechanism rotates each of the magnetic heads around a rotary shaft which is mounted almost perpendicular to the corresponding cassette tape and integral with the magnetic head.

4 Claims, 4 Drawing Sheets

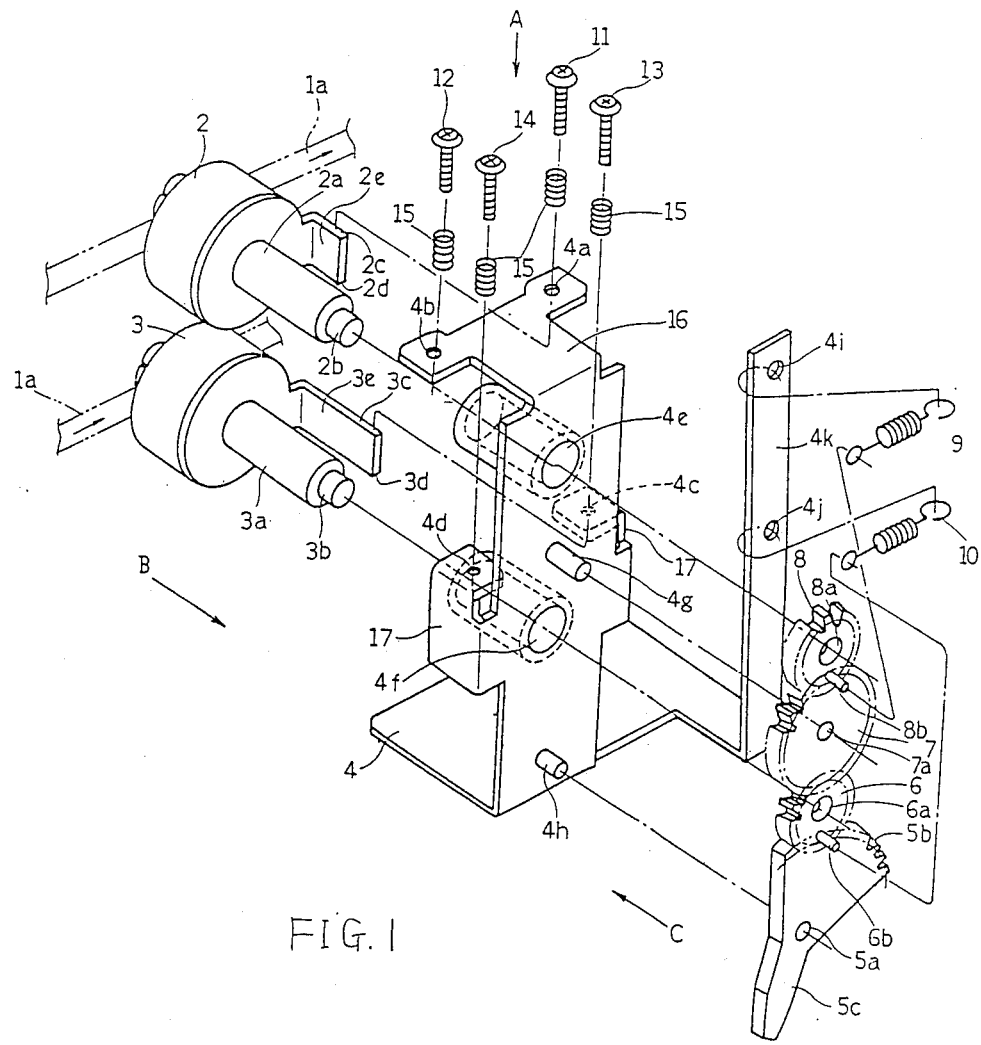
FIG. I

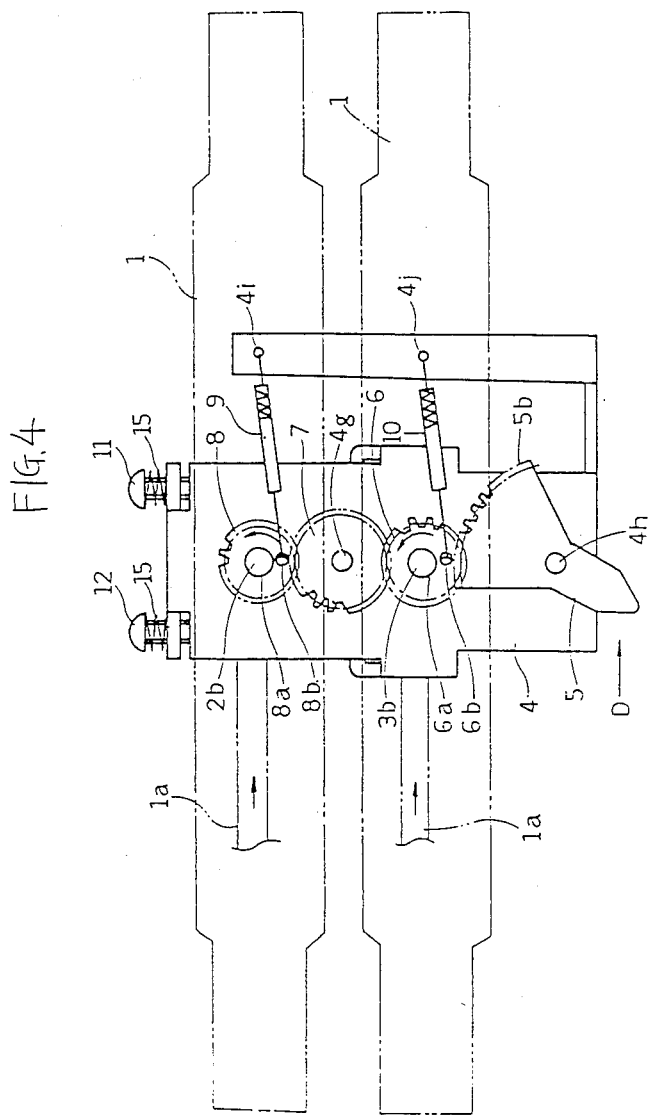

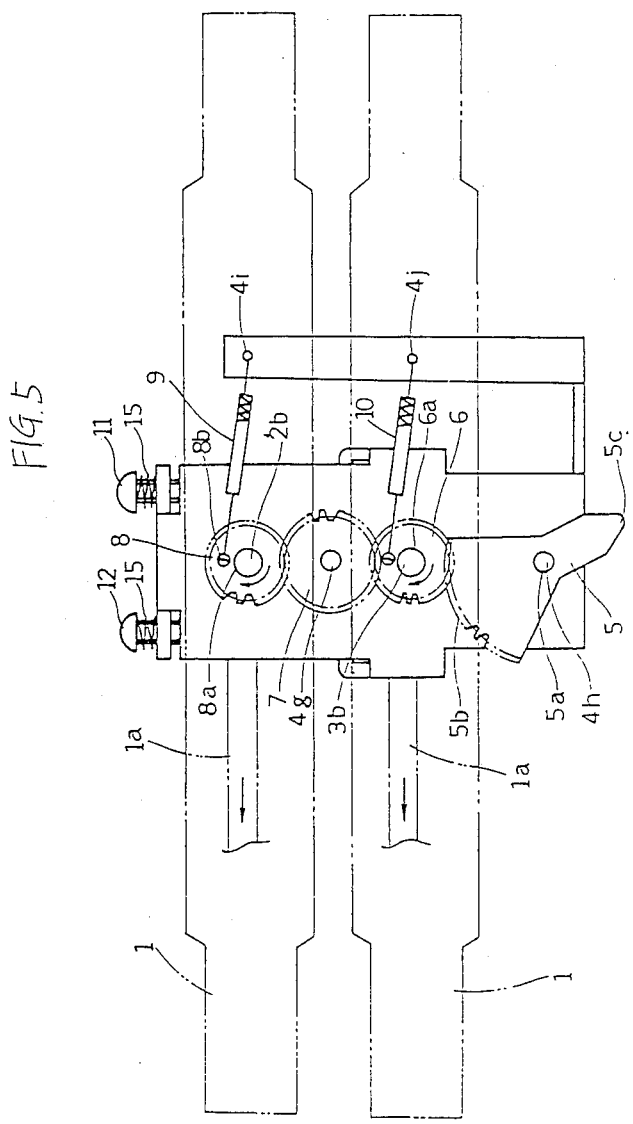

MAGNETIC HEAD SUPPORTING MECHANISM FOR TAPE RECORDER

BACKGROUND OF THE INVENTION

The present invention relates to a tape recorder or more particularly to a magnetic head supporting mechanism of a cassette tape recorder capable of housing a plurality of tape cassettes in a pile.

Conventionally, in a tape recorder with an auto reverse function which drives two tapes simultaneously for dubbing or independently for recording or reproduction operation, the two tape cassettes are loaded in the same plane in the tape recorder. Accordingly, it is necessary to provide a magnetic head for each cassette tape and therefore a magnetic head rotary mechanism independently for each cassette tape. In addition, each magnetic head required an independent azimuth adjustment mechanism.

These requirements result in a bulky tape recorder which occupies a large amount of space.

To overcome this conventional problem, the applicant has developed a tape recorder in which tape cassettes are loaded parallel to each other in a pile. Such a tape recorder is advantageous in that the mechanical section can be assembled into an extremely compact size. In order to realize such a compact tape recorder, it is also desirable to provide a small and as low cost as possible magnetic head rotary mechanism which can rotate magnetic heads all at once by a one touch operation.

Furthermore, it is also desirable that the magnetic head azimuth adjustment mechanism is compact and easy to operate.

SUMMARY OF THE INVENTION

An object of the present invention is to provide a magnetic head supporting mechanism of a cassette tape recorder capable of housing a plurality of tape cassettes in a pile, and driving the tapes more effectively by providing a driving mechanism common to all the tape cassettes.

Another object of the present invention is to provide a rational rotary mechanism for multiple magnetic heads in a pile.

Still another object of the present invention is to provide an easy-to-operate, low cost and compact azimuth angle adjusting device for multiple magnetic heads provided in a pile in a tape recorder in which multiple tape cassettes are loaded.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, the magnetic head supporting mechanism of a cassette tape recorder comprises a plurality of magnetic heads which face the respective cassette tapes set in cassette halves loaded in parallel to each other in a pile, said magnetic heads being rotatable around the axis of the rotary shafts perpendicular to the cassette tapes and integral with the respective magnetic heads. Therefore, in the sense that the rotary shafts are interconnected so that they can be simultaneously rotated the same angle by a synchronous rotary member, the magnetic head supporting mechanism of the present invention is an azimuth adjustment device. A typical example of the synchronous rotary member is a gear mechanism shown in the following embodiment. The combination of chains and sprockets or of friction wheels, belts and pulleys may be used as another example.

Furthermore, according to the present invention, a contact face is formed on each magnetic head and azimuth adjustment screws are provided on each magnetic head supporting member from one side, so that the azimuth adjustment screws come in contact with the contact faces of the magnetic heads at a position for either forwarding or reversing operation, thus making it possible to adjust the azimuth angle of the magnetic heads rotatably mounted around the rotary shafts virtually perpendicular to the cassette tapes. In addition, the position of the azimuth adjustment screws is staggered for each magnetic head.

The present invention is applicable not only to a tape recorder as described in the following embodiment but also to the magnetic head rotary mechanism of a video tape recorder.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a disassembled perspective view of a cassette tape recorder magnetic head supporting mechanism, of an embodiment of the present invention;

FIG. 4 is a plan view of the magnetic head supporting mechanism viewed from the direction C of FIG. 1; and FIG. 5 is a plan view of the magnetic head supporting mechanism of FIG. 4 in which the magnetic heads are rotated 180 degrees.

DETAILED DESCRIPTION OF THE INVENTION

Figure 3:
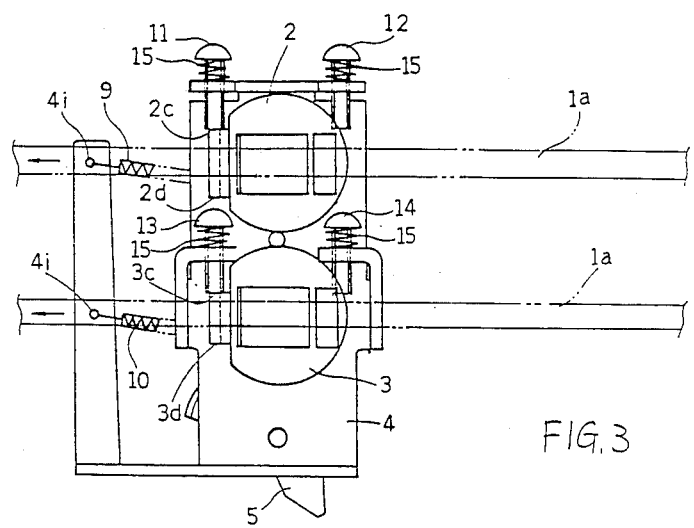
FIG. 3 is a plan view of the magnetic head supporting mechanism viewed from the direction B of FIG. 1.
Figure 2:
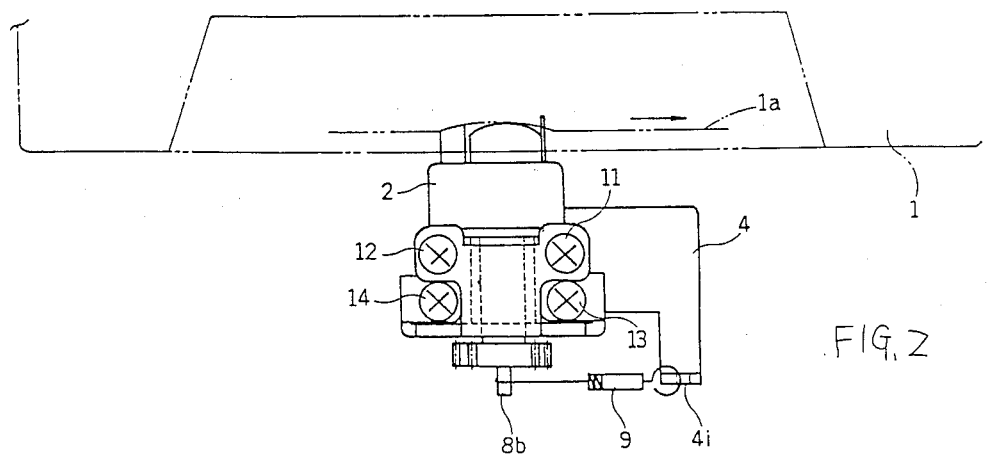
FIG. 2 is a plan view of the magnetic head supporting mechanism viewed from the direction A of FIG. 1.

FIG. 1 is a disassembled perspective view of a cassette tape recorder magnetic head supporting mechanism of an embodiment of the present invention. FIGS. 2, 3 and 4 are plan views of the magnetic head supporting mechanism viewed from the directions A, B and C, respectively, of FIG. 1. FIG. 5 is a plan view of the magnetic head supporting mechanism of FIG. 4 in whch the magnetic heads have been rotated 180 degrees.

The cassette tape recorder of the present invention is capable of housing a plurality of cassette tapes in a pile and capable of driving one or more of the plurality of cassette tapes independently or simultaneously for recording, reproduction or dubbing operation. A cassette tape recorder in which two tape cassettes can be loaded is described as an embodiment of the present invention. The magnetic head supporting mechanism shown in FIG. 1 also functions as a magnetic head azimuth angle adjusting device and as a magnetic head rotary mechanism; the mechanism is hereinafter referred to as a magnetic head supporting mechanism for convenience sake.

The following embodiment is just an example of the present invention and not intended to limit the technical scope thereof.

The embodiment of the present invention relates to a tape recorder in which two tape cassettes 1 and 1' piled parallel to each other are fixed by holder means (not shown), as shown in FIG. 4.

Referring to FIG. 1, 1a and 1a' are magnetic tapes housed within the tape cassettes 1 and 1', respectively. The magnetic tapes 1a and 1a' are faced to magnetic heads 2 and 3, respectively, which are adjacent and parallel to each other as shown. During a recording or reproduction operation, the magnetic tapes 1a and 1a' are placed in contact with the magnetic heads 2 and 3 by means of a guide mechanism which is not shown.

The magnetic heads 2 and 3 have integral rotary shafts 2a and 3a which are virtually perpendicular to the corresponding magnetic tapes 1a and 1a', respectively.

The rotary shafts 2a and 3a are rotatably supported by bearings 4e and 4f, respectively, which are fixed in parallel to each other on a head base 4.

Gears 8 and 6 of the same diameter are pressure-fixed on the opposite ends 2b and 3b of the rotary shafts 2a and 3a from the magnetic heads 2 and 3, respectively.

The gears 6 and 8 are engaged with a connection gear 7 rotatably fit on a rod 4g which is secured on the head base 4.

A support fulcrum pin 4h is fixed, in parallel to the rod 4g, on the head base 4. A toothed sector 5b of a selection lever 5 rotatably mounted on the support fulcrum pin 4h is engaged with the gear 6 whereby rotation of the selection lever 5 around the axis of the support fulcrum pin 4h causes the gears 6 and 8 to rotate at the same angle and in the same direction due to the intervention of the connection gear 7.

The gears 6, 7 and 8 have a large backlash and engage with each other with moderate play so that the azimuth angle can be adjusted as required.

Spring-fixing pins 8b and 6b are provided on the face of the gears 8 and 6, respectively.

An arm 4k is integrally formed with the head base 4. Spring-fixing holes 4i and 4j are formed in the arm 4k, spaced apart from each other by the same distance as the interval between the bearings 4e and 4f. A tension spring 9 is mounted between the spring-fixing hole 4i and the spring-fixing pin 8b pressing the gear 8 against the gear 7. Similarly, a tension spring 10 is mounted between the spring-fixing hole 4j and the spring-fixing pin 6b, pressing the gear 6 against the gear 7. Thus, the backlash between the gears 8 and 7 and that between the gears 7 and 6 are eliminated.

An upper arm 16 projects in a horizontal direction from the upper end of the head base 4. The upper arm 16 is parallel to the bearings 4e and 4f which are integral with the head base 4. Screw holes 4a and 4b are formed at a specified interval, longitudinally along the magnetic tape 1a, in the end portion of the upper arm 16. As shown in FIGS. 2 and 3, a FWD (forward) azimuth machine screw 11 and a REV (reverse) azimuth machine screw 12 are screwed with interposition of compression springs 15 in the holes 4a and 4b, respectively, from the same side.

Under the upper arm 16, lower arms 17 and 17 protrude from the head base 4, in parallel with and in the same direction as the upper arm 16. A screw hole 4c or 4d parallel with the screw hole 4a or 4b is formed in the end of each arm 17.

A FWD azimuth machine screw 13 and a REV azimuth maching screw 14 are screwed with interposition of compression springs 15 in the screw holes 4c and 4d from the same side as the azimuth machine screws 11 and 12.

Contact faces 2e and 3e are integrally formed with the magnetic heads 2 and 3, respectively. The contact face 2e is spaced apart from the axis center of the rotary shaft 2a so that when the magnetic head 2 is in the forwarding position as shown in FIGS. 1 and 4, an end 2c of the contact face 2e comes in contact with the lower end of the azimuth machine screw 11, and when the magnetic head 2 is rotated 180 degrees to be positioned for reversing operation, the other end 2d of the contact face 2e comes in contact with the lower end of the azimuth machine screw 12.

Similarly, the contact face 3e is spaced apart from the axis center of the rotary shaft 3a so that when the magnetic head 3 is in the forwarding position, an end 3c of the contact face 3e comes in contact with the lower end of the azimuth machine screw 13 and, when the magnetic head 3 is in the reversing position, the other end 3d of the contact face 3e comes in contact with the lower end of the azimuth machine screw 14.

As shown in FIG. 2, the azimuth machine screws 11 and 12 are at the same distance from the magnetic tape 1a along the axis of the rotary shaft 2a, and the azimuth machine screws 13 and 14 are also at the same distance from the magnetic tape 1a along the axis of the rotary shaft 3a. However, the position of the azimuth machine screws 11 and 12 and that of the azimuth machine screws 13 and 14 are staggered along the axis of the rotary shafts 2a and 3a, enabling each azimuth machine screw to be adjusted from the same side by a screw driver.

According to the present invention, therefore, it is possible to access the four azimuth machine screws from the same side for adjustment of azimuth angle. Specifically, if protrusion of each azimuth machine screw 11, 12, 13 or 14 is controlled by using the screw driver, the contact position between the azimuth machine screw and the contact face 2e or 3e can be adjusted as desired, and consequently the azimuth angle of the magnetic head 2 or 3 integral with the contact face 2e or 3e is properly adjusted.

When the magnetic tape 1a runs in the forwarding direction as indicated by the arrow in FIG. 4, the selection lever 5 is rotated clockwise to the limit as shown in FIG. 4. Accordingly, the gears 6 and 8 rotate counterclockwise. Since the contact faces 3e and 2e which are integral via the rotary shafts 3a and 2a with the gears 6 and 8 are made in contact with the lower end of the azimuth machine screws 13 and 11, respectively, the counterclockwise rotation of the gears 6 and 8 are restricted for the appropriate azimuth angle.

Since fairly large backlash is provided between the gears 6 and 7 and between the gears 7 and 8 as mentioned above, even if the rotation angle of the gears 6 and 8 is limited to some extent by the selection lever 5, the gears 6 and 8 are allowed to rotate independently by the amount of play corresponding to the backlash. They are allowed to rotate until the contact faces 3e and 2e are made in contact with the lower end of the azimuth machine screws 13 and 11 by the force of the tension springs 10 and 9, respectively.

When the magnetic tape 1a runs in the reversing direction as indicated by the arrow in FIG. 5, the selection lever 5 is rotated counterclockwise to the limit as shown in FIG. 5. Accordingly, the gears 6 and 8 are rotated by the force of the tension springs 10 and 9 until the contact faces 3e and 2e come in contact with the lower end of the azimuth machine screws 14 and 12, respectively. Since the azimuth machine screws 12 and 14 are fixed for adequate protrusion, appropriate azimuth angle is maintained for the magnetic heads 3 and 2 in the reversing position.

As a modification of this embodiment, the magnetic heads 2 and 3 may be rotated independently. In that case, the connection gear 7 is omitted.

In the magnetic head supporting mechanism of the present invention, as understood from the above, a plurality of magnetic heads arranged facing the cassette tapes set in the tape cassettes loaded one over another and parallel to one another are simultaneously rotated around the axis of the rotary shafts which are almost perpendicular to the respective cassette tapes and integral with the respective magnetic heads.

In other words, the present invention provides a magnetic head rotary mechanism which is characterized in that the rotary shafts are interconnected so as to be rotated the same angle simultaneously by means of a synchronous rotary member. It means that the magnetic heads facing the multiple cassette tapes loaded in a pile can be rotated simultaneously by the simple mechanism. Besides, due to the simple and integrated construction, low cost and compact magnetic head rotary device can be realized.

Furthermore, as an azimuth angle adjusting device for magnetic heads, as mentioned above, contact face is formed on each of the magnetic heads and, azimuth adjustment screws are provided from one side of the magnetic head supporting member at positions corresponding to the contact faces of of the magnetic heads in the forwarding and reversing positions, the position of the azimuth adjustment screws being staggered for each magnetic head. Accordingly, it is possible to adjust, by simple operation, the azimuth angle of the individual magnetic heads facing the recording tapes loaded in a pile. In addition, because of the simple and integrated construction, low cost and compact azimuth angle adjusting device can be realized.

As mentioned above, the present invention relates to a magnetic head supporting mechanism for azimuth angle adjustment and proper rotation of the magnetic heads in a recorder and reproducer capable of housing a plurality of cassette tapes in a pile and provided with reverse turn function.

While only certain embodiments of the present invention have been described, it will be apparent to those skilled in the art that various changes and modifications may be made therein without departing from the spirit and scope of the present invention as claimed.

What is claimed is:

1. A magnetic head supporting mechanism which comprises
    a plurality of magnetic heads having front and rear sides, said front sides being adapted to face respective cassette tapes,
    rotary shafts integral with and extending from the rear sides of each of said magnetic heads and
    a synchronous rotary mechanism interconnected with said rotary shafts whereby the magnetic heads facing the multiple cassette tapes are simultaneously rotated at the same angle around the rotary shafts.

2. The magnetic head supporting mechanism of claim 1 wherein the synchronous rotary member comprises gear means fixed to the rotary shafts,
    connecting gear means providing connective engagement between said gear means, and
    a selective lever rotatably mounted to engage one of said gear means whereby upon the rotation of the selection lever, the magnetic heads facing the multiple cassette tapes are simultaneously rotated at the same angle.

3. The magnetic head supporting mechanism of claim 1 containing a means for adjusting the azimuth angle of said magnetic heads.

4. The magnetic head supporting mechanism of claim 3 wherein said azimuth angle adjusting means comprises a contact face formed on each of said magnetic heads, and azimuth adjustment screws provided from one side in said magnetic head-supporting means at positions corresponding to the contact faces of the magnetic heads in the forwarding and reversing positions, the position of said azimuth adjustment screws being staggered for each magnetic head.

* * * * *